US010116044B2

(12) United States Patent
Zhu et al.

(10) Patent No.: US 10,116,044 B2
(45) Date of Patent: Oct. 30, 2018

(54) BODY-MOUNTABLE DEVICE TO PROVIDE RADIO-FREQUENCY WIRELESS COMMUNICATION

(71) Applicant: Google Inc., Mountain View, CA (US)

(72) Inventors: Jiang Zhu, Cupertino, CA (US); Benjamin Leung, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/453,770

(22) Filed: Mar. 8, 2017

(65) Prior Publication Data

US 2018/0261911 A1   Sep. 13, 2018

(51) Int. Cl.
| | |
|---|---|
| H04W 88/00 | (2009.01) |
| H01Q 1/27 | (2006.01) |
| H01Q 7/00 | (2006.01) |
| H01Q 1/24 | (2006.01) |
| H01Q 5/30 | (2015.01) |
| H04M 1/04 | (2006.01) |
| H04W 88/06 | (2009.01) |

(52) U.S. Cl.
CPC ............ *H01Q 1/273* (2013.01); *H01Q 1/242* (2013.01); *H01Q 5/30* (2015.01); *H01Q 7/00* (2013.01); *H04M 1/04* (2013.01); *H04W 88/06* (2013.01)

(58) Field of Classification Search
CPC .................................................. H04M 1/0249
USPC ............................................ 455/575.1, 575.7
See application file for complete search history.

(56) References Cited

U.S. PATENT DOCUMENTS

| | | | |
|---|---|---|---|
| 5,530,453 A | 6/1996 | Koyama | |
| 6,825,751 B1 * | 11/2004 | Kita | G06K 19/04 340/10.52 |
| 6,914,564 B2 * | 7/2005 | Barras | G04G 21/04 340/7.63 |
| 7,038,634 B2 | 5/2006 | Bisig | |
| 7,215,600 B1 * | 5/2007 | Derosa | G04G 21/04 343/718 |
| 8,913,016 B2 * | 12/2014 | Raty | G04G 21/04 345/173 |

(Continued)

FOREIGN PATENT DOCUMENTS

| | | |
|---|---|---|
| CN | 204441452 | 7/2015 |
| CN | 205649060 | 10/2016 |

OTHER PUBLICATIONS

International Search Report and Written Opinion dated Feb. 6, 2018 for PCT Application No. PCT/US2017/058158, 15 pages.

*Primary Examiner* — Wen Huang (57) ABSTRACT

Techniques and mechanisms to provide wireless communication with a body-mountable device comprising a single-loop antenna. In an embodiment, distal ends of the single-loop antenna are disposed on opposite sides of a slit structure, wherein the single-loop antenna extends around a controller configured to provide any of multiple modes of high-frequency communication with the single-loop antenna. Different operational modes each provide for operation of the single-loop antenna with both a proximity-coupled feed structure and a first contact at or near a distal end of the single-loop antenna. In another embodiment, the single-loop antenna forms a hole or a recess structure which is aligned with a sensor or an input/output (I/O) mechanism of the body-mountable device.

22 Claims, 7 Drawing Sheets

(56) References Cited

U.S. PATENT DOCUMENTS

| | | | |
|---|---|---|---|
| 2002/0098807 A1* | 7/2002 | Saarnimo | H04B 1/385 |
| | | | 455/74 |
| 2010/0112964 A1* | 5/2010 | Yi | G04G 9/0064 |
| | | | 455/90.3 |
| 2011/0133995 A1* | 6/2011 | Pascolini | H01Q 7/00 |
| | | | 343/702 |
| 2012/0088560 A1* | 4/2012 | Wehrmann | H04B 1/3838 |
| | | | 455/575.7 |
| 2014/0086026 A1 | 3/2014 | Milani et al. | |
| 2014/0187178 A1* | 7/2014 | Yang | H01Q 9/06 |
| | | | 455/77 |
| 2015/0048979 A1 | 2/2015 | Asrani et al. | |
| 2015/0084817 A1* | 3/2015 | Yong | H01Q 1/243 |
| | | | 343/702 |
| 2016/0295335 A1* | 10/2016 | Vajha | H01Q 1/36 |
| 2017/0025743 A1 | 1/2017 | Kim et al. | |

\* cited by examiner

BODY-MOUNTABLE DEVICE TO PROVIDE RADIO-FREQUENCY WIRELESS COMMUNICATION

BACKGROUND

1. Technical Field

Embodiments of the present invention relate generally to mobile devices and more particularly, but not exclusively, to antenna structures of a body-mountable communication device.

2. Background Art

With an ever-increasing demand for wireless communication access, various portable devices—that traditionally are not constructed as communicating devices—are being designed with integrated wireless communication capability. To date, small form factor devices have been limited to re-designs that provide only somewhat limited wireless network functionality. In one typical example, a conventional body area network includes both a smart phone and a smaller mobile device which is designed to participate in near-field communication with the smart phone. The near-field communication is relatively low frequency, where the smart phone functions as access point to provide higher-bandwidth access to a larger wireless network on behalf of the other mobile device.

As mobile devices continue to grow in number, functionality and variety, there is expected to be an increasing premium placed on solutions for small form factor mobile devices to operate in systems which support high-frequency wireless communication.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Embodiments described herein variously provide wireless communication with a body-mountable device comprising an antenna which forms a single loop structure (for brevity, a "single-loop antenna"). In an embodiment, the single-loop antenna extends around a region in which is disposed circuitry of the body-mountable device, where such circuitry is configured to provide any of multiple modes of high-frequency communication using the single-loop antenna.

Such high-frequency communication may be, for example, be according to or otherwise compatible with a long-term evolution (LTE) standard such as the LTE standard finalized in December 2008 by the 3rd Generation Partnership Project (3GPP) or the LTE Advanced standard released in March 2011 by 3GPP.

Figure 1A:
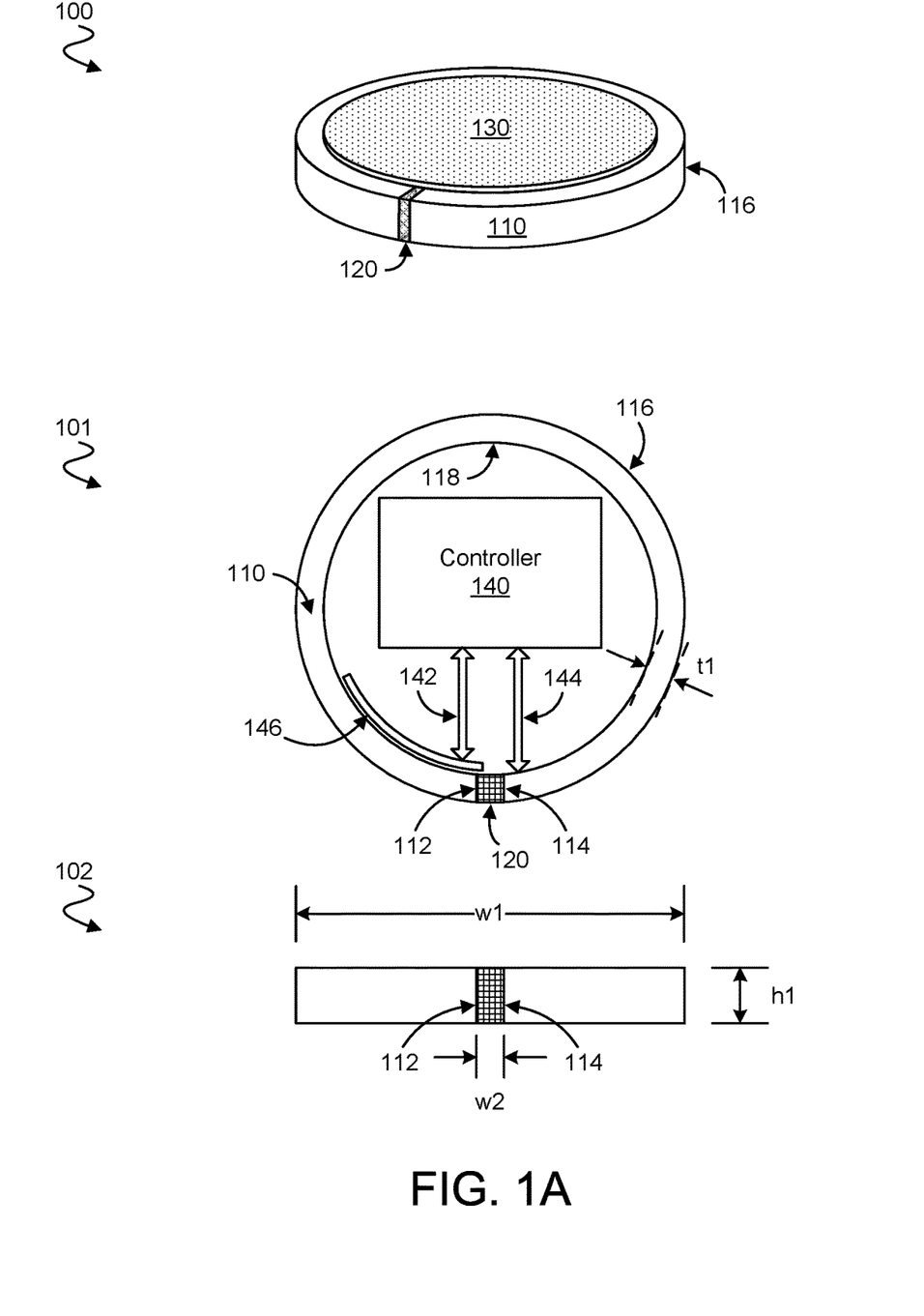
FIGS. 1A, 1B show respective body-mountable devices each to provide wireless communication according to a corresponding embodiment.

FIG. 1A illustrates features of a body-mountable communication device 100 to provide wireless communication according to an embodiment. Body-mountable communication device 100 is one example of an embodiment wherein a mobile device is configured to be worn directly or indirectly on a body of a user. An exterior sidewall of the mobile device may be formed at least in part by a loop antenna that facilitates radio frequency communication such as that according to a LTE standard. Unless otherwise indicated, 'radio frequency communication' refers herein to communication which is at a frequency equal to or more than 100 megahertz (MHz). Some embodiments support a wide band of LTE (or other) radio frequency communication modes—e.g., wherein a difference between a first frequency of a first communication mode and a second frequency of a second communication mode is 1000 MHz or more—e.g., wherein the difference is 1500 MHz or more and, in some embodiments, 2000 MHz or more.

In the illustrative embodiment shown, body-mountable communication device 100 includes a single-loop antenna 110 extending around a region 130 in which is disposed circuitry to facilitate wireless communication using single-loop antenna 110. Such circuitry may include transmitter logic and/or receiver logic—e.g., where other circuitry of communication device 100 provides for input and/or output (I/O) which is based on (or which determines) such communication.

Single-loop antenna 110 may structurally define at least in part (e.g., may extend almost entirely around) a periphery of region 130—e.g., wherein an exterior side 116 of the antenna 110 (opposite an interior side 118) forms an exterior sidewall structure of device 100. Such a sidewall structure may conform to a circle, ellipse, rectangle (e.g., a square) or any of a variety of other shapes. In some embodiments, antenna 110 further forms any of a variety of bevel structures (not shown) adjoining side 116.

As variously shown in the top view 101 and side view 102 of communication device 100, single-loop antenna 110 may have a height h1 and a width w1, wherein a given section along a length of single-loop antenna 110 has a thickness t1. By way of illustration and not limitation, an average of height h1 may be in a range of 3 mm to 8 mm (e.g., in a range of 4 mm to 6 mm)—e.g., where an average of width w1 is in a range of 50 mm to 80 mm (e.g., in a range of 55 mm to 65 mm) and/or an average of thickness t1 is in a range of 0.5 mm to 1.5 mm (e.g., in a range of 0.8 mm to 1.2 mm). Alternatively or in addition, an overall length along antenna 110 between distal ends 112, 114 thereof (the overall length measured around a periphery of region 130) may be less than 250 mm—e.g., in a range of 100 mm to 250 mm. However, such dimensions of antenna 110 are merely illustrative, and may vary in different embodiments according to implementation-specific details.

Single-loop antenna 110 may facilitate functionality to participate in wireless communication to and/or from communication device 100. For example, single-loop antenna 110 may comprise stainless steel, aluminum, magnesium and/or any of a variety of other metals adapted from conventional antenna designs. Distal end 112 of antenna 110 may be positioned opposite distal end 114, where antenna 110 conforms to a generally annular shape. Antenna 110 may form a single loop structure which extends around substantially all (e.g., more than 95% and, in some embodiments, more than 98%) of a periphery of region 130. For example, distal ends 112, 114 may be separated from one another to form therebetween a slit structure 120 extending to the exterior sidewall. As compared with an overall distance along the length of antenna 110 between distal ends 112, 114, a width w2 of slit structure 120 may be quite small—e.g., less than 4.0 mm (for example, in a range of 0.5 mm to 3.0 mm and, in some embodiments, between 0.75 mm and 1.5 mm).

Slit structure 120 may provide electrical insulation along a path extending directly between distal ends 112, 114. For example, slit structure 120 may have disposed therein any of a variety of a dielectric materials including, but not limited to a polycarbonate/acrylonitrile butadiene styrene (PC/ABS) material, a EXL1414 polycarbonate (PC) siloxane copolymer resin material and/or the like.

The region 130, circumscribed by the single-loop antenna 110, may have disposed therein logic (e.g., including the illustrative controller 140 shown) coupled to provide wireless communication using single-loop antenna 110. Logic of controller 140 may include any of a variety of combinations of hardware, firmware and/or executable software—e.g., where such logic comprises an application specific integrated circuit, field programmable circuitry, a process executing with a processor and/or the like. Controller 140 may be coupled—e.g., via interfaces 142, 144—to operate antenna 110. Interface 142 may comprise a conductor which is coupled to provide a short between controller 140 and a proximity-coupled feed structure 146 for driving communication with antenna 110. In such an embodiment, interface 144 may comprise a conductor which shorts controller 140 to antenna 110 via a contact which is at or near distal end 114. One or more spring contacts (not shown) may be used to couple interface 142 to feed structure 146 and/or to couple interface 144 to antenna 110.

As used herein with reference to the operation of a single loop antenna, "proximity-coupled feed structure" refers to a conductive structure that is positioned proximate to, but not in direct physical contact with, a side of an antenna. Communication using such a proximity-coupled feed structure may include an electromagnetic field interaction across a gap (or other intervening structure) which is between the proximity-coupled feed structure and the opposing side of the antenna. For example, transmit communication may include proximity-coupled feed structure 146 exciting electromagnetic radiation with antenna 110—e.g., wherein receive communication includes electromagnetic radiation at antenna 110 exciting a voltage signal or current signal from proximity-coupled feed structure 146 to controller 140 via interface 142.

Proximity-coupled feed structure 146 may include any of a variety of metals including, but not limited to, nickel, gold, copper, alloys (e.g., stainless steel) and/or the like. Proximity-coupled feed structure 146 may comprise a conductor disposed proximate to a region of antenna 110 which is at or near a distal end thereof (e.g., proximate to distal end 112). Proximity-coupled feed structure 146 may be only indirectly coupled to distal end 112—e.g., via the in-series combination of interface 142, controller 140, interface 144 and the remaining portion of antenna 110 (which comprises distal end 114). In an embodiment, proximity-coupled feed structure 146 is electrically coupled to, and extends from, a printed circuit board which has controller 140 disposed therein or thereon. Proximity-coupled feed structure 146 may primarily extend along a direction which is substantially perpendicular to—e.g., ±ten degrees (10°)—a top side of the printed circuit board. Alternatively or in addition, such a direction may be substantially parallel to—e.g., ±ten degrees (10°)—interior side 118. Proximity-coupled feed structure 146 and interior side 118 may be separated from one another by an air gap or, in some embodiments, an insulator structure to provide a small offset therebetween.

In one illustrative embodiment, a separation distance between interior side 118 and a closest side of proximity-coupled feed structure 146 is in a range of 0.5 mm to 1.5 mm—e.g., wherein the spacing is in a range of 0.8 mm to 1.2 mm. Alternatively or in addition, a separation distance between proximity-coupled feed structure 146 and controller 140 (e.g., between proximity-coupled feed structure 146 and a PCB including controller 140) may be in a range of 0.5 mm to 5.0 mm. A sectional thickness of proximity-coupled feed structure 146 may be in a range of 0.05 mm to 0.2 mm, for example. Alternatively or in addition, a length of proximity-coupled feed structure 146 along a portion of interior side 118 may be in a range of 5.0 mm to 50.0 mm—e.g., in a range of 20 mm to 35 mm. This length may vary according to the overall length of antenna 110—e.g., to provide communication modes that each implement a respective one of a LTE lower band, LTE middle band and LTE upper band. The above-described dimensioning of proximity-coupled feed structure 146 and/or structures near proximity-coupled feed structure 146 is merely illustrative of some embodiments, and may vary according to implementation-specific details.

Although some embodiments are not limited in this regard, the dimensioning of proximity-coupled feed structure 146 may be achieved, for example, using laser direct structuring (LDS) processes—e.g., to define the formation of conductive structures onto a plastic film. After deposition of a conductor thereon, such a plastic film may be mounted into or on a metal frame or other support structure. In other embodiments, proximity-coupled feed structure 146 includes sheet metal, flexible printed circuit and/or the like.

Controller 140 may include any of various processor, controller and/or other circuit logic which, when executed, operates with proximity-coupled feed structure 146 and antenna 110 to perform signal transmission and/or signal reception. Such communication may, for example, be based on any of multiple communication modes of signaling which are capable of being performed with antenna 110. The multiple communication modes may, for example, include at least two different wavelength modes and, in some embodiments, at least three different wavelength modes. The different wavelength modes may, for example, include one or more of a one (1) wavelength mode, a two (2) wavelength mode and a three (3) wavelength mode. In this context, "N-wavelength mode" (for some positive integer N) refers to a mode of communication using an electromagnetic wave which has a given wavelength in an antenna, wherein an overall length of that antenna accommodates N times that wavelength—e.g., but not N+1 times that wavelength. In one illustrative embodiment, the one-wavelength mode may provide a LTE low band including a range of 800 MHz to 960 MHz (e.g., for any of LTE bands B5 and B8)—e.g., wherein the two-wavelength mode provides a LTE mid-band including a range from 1710 MHz to 2200 MHz (e.g., for any of LTE bands LTE B1, B2, B3 and B4) and/or the three-wavelength mode provides a LTE high band including a range from 2300 MHz to 2700 MHz (e.g., for any of LTE bands B38, B39, B41 and B7). However, more, fewer and/or different modes and/or frequency bands may be provided by operation of antenna 110, in other embodiments.

Antennas tend to radiate when an imaginary part of their input impedance is at or near zero. For a loop antenna, reduction of the imaginary part of its impedance may be facilitated when the antenna's length (e.g., circumferential distance) is at or near one wavelength, or an integer multiple of one wavelength. In some embodiments, a wavelength mode may be facilitated by a dimensioning of antenna 110 which accounts for the proximity of a user's body tissue to device 100. By way of illustration and not limitation, a communication in a LTE low communication band may, for example, have a frequency of 850 MHz which corresponds to a wavelength of approximately 350 mm in air or in a vacuum. However, the 850 MHz communication may be provided during a one-wavelength mode of antenna 110, wherein the overall length of antenna 110—as measured around a periphery of region 130 between distal ends 112, 114—is substantially smaller (e.g., at least 10% more) than 350 mm. In one example embodiment, the overall length of antenna 110 is in a range of 185 mm to 195 mm (e.g., where w1 is between 55 mm and 65 mm). This significantly smaller overall length of antenna 110 may account for load effects that may be due to the proximity of a user's body tissue.

Although some embodiments are not limited in this regard, controller 140 (and/or other circuitry in region 130) may provide communication device 100 with other functionality in addition to that for communication using antenna 110. For example, region 130 may have disposed therein processor, memory and/or other circuit logic to execute an operating system and/or other software processes. Alternatively or in addition, circuitry of communication device may provide input/output functionality (e.g., with display, audio, haptic, touchscreen and/or other mechanisms of communication device 100) for providing a user with access to such an operating system. Other circuitry of communication device 100 may provide sensor functionality (e.g., temperature, vibration, pressure, motion, etc.) and/or alternative types of communication (e.g., near field communication), although some embodiments are not limited in this regard.

Figure 1B:
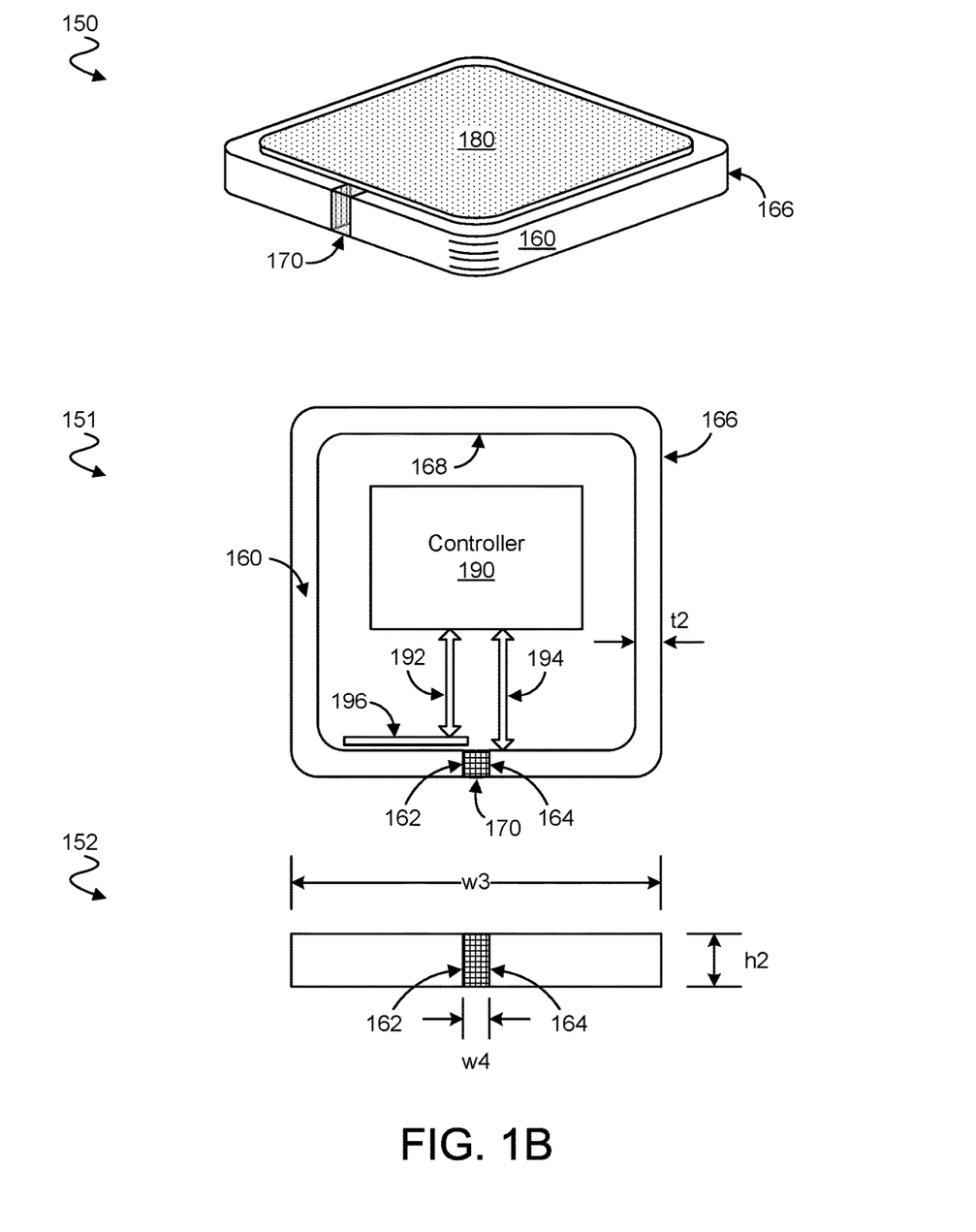

FIG. 1B illustrates features of a body mountable communication device 150 to provide high-frequency (e.g., LTE) communication according to another embodiment. Communication device 150 may include one or more features of communication device 100—e.g., wherein a cross-sectional profile of communication device 150 conforms to a rectangular shape, rather than a circle. In the illustrative embodiment shown, communication device 150 includes a single-loop antenna 160, slit structure 170, controller 190 and proximity-coupled feed structure 196 which, for example, provide corresponding functionality of single-loop antenna 110, slit structure 120, controller 140 and proximity-coupled feed structure 146, respectively. Antenna 110 may have a height h2, width w3 and sectional thickness t2 (e.g., having respective features of height h1, width w1 and sectional thickness t1).

As variously shown in the side view 151 and top view 152 of communication device 150, an exterior side 166 of antenna 160 (the side 166 opposite an interior side 168) may form at least in part an exterior sidewall structure of communication device 150. Distal ends 162, 164 of antenna 110 may be positioned on opposite respective sides of slit structure 170, where antenna 160 conforms to a generally annular rectangle shape. The region 180 circumscribed by antenna 160 may have disposed therein controller 190 coupled to provide wireless communication using single-loop antenna 160. For example, controller 190 may be coupled via interfaces 192, 194 to operate antenna 160. Interfaces 192, 194 may, for example, correspond to interfaces 142, 144, respectively. Controller 190 may facilitate any of two or more modes that each implement a respective one of multiple radio frequency communication bands—e.g., including two or more of a LTE lower band, LTE middle band and LTE upper band.

Figure 2:
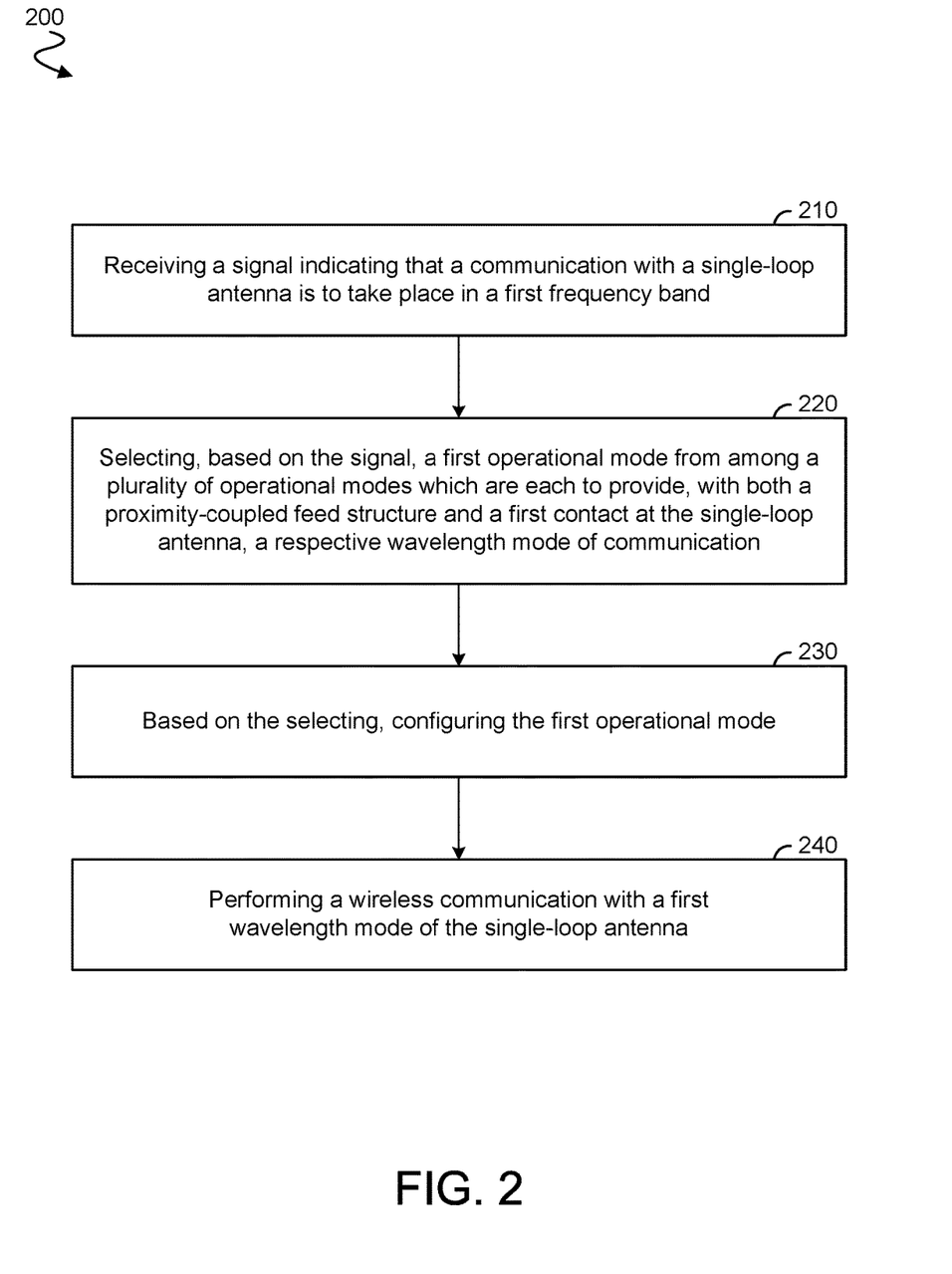
FIG. 2 shows a method to operate a body-mountable device according to an embodiment.

FIG. 2 illustrates elements of a method 200 to operate a body-mountable device. Method 200 may be performed at one of body-mountable communication devices 100, 150 or any of various other body-mountable devices having features described herein.

In one embodiment, method 200 comprises, at 210, receiving a signal indicating that communication with a single-loop antenna of the body-mountable device is to take place in a first frequency band. The first frequency band may be a high-frequency band—e.g., wherein each frequency in the first frequency band is above 100 MHz. The signal received at 210 may include or otherwise be based on any of a variety of one or more inputs provided to circuitry of the body-mountable device—e.g., wherein the single-loop antenna extends around a region including such circuitry. Such an input may be provided, for example, by a manufacturer, distributor, retailer, administrator, user, or other agent. An input may be provided by direct interaction with a touchscreen, microphone, haptic sensor and/or other input mechanism of the body-mountable device. Alternatively or in addition, an input may be received via with the single-loop antenna or via another wireless communication component of the body-mountable device. In one example embodiment, the signal received at 210 may be based at least in part upon a passive detection of a communication functionality which is supported by a wireless network in a region accessible to the body-mountable device. However, some embodiments are not limited with respect to the particular source and/or form of the received signal.

In an embodiment, the single-loop antenna has features of one of antennas 110, 160. For example, an exterior sidewall of the body-mountable device may be formed at least in part by the single-loop antenna, where distal ends of the single-loop antenna are disposed on opposite respective sides of a slit structure in the exterior sidewall. An overall length of the single-loop antenna—e.g., as measured along the single-loop antenna from one of the distal ends to the other of the distal ends—may be equal to or less than 250 mm.

Method 200 may further comprise, at 220, selecting, based on the signal, a first operational mode from among a plurality of operational modes which are each to provide, with both a proximity-coupled feed structure and a first contact at the single-loop antenna, a respective wavelength mode of communication by the single-loop antenna. For example, the first operational mode may correspond to a first frequency band above 100 MHz, wherein the first operational mode provides a first wavelength mode of communication (e.g., a one-wavelength mode) by the single-loop antenna. By contrast, a second operational mode of the plurality of operational modes may correspond to a second frequency band which is also above 100 MHz, the second operational mode to provide a second wavelength mode of communication by the single-loop antenna, the second wavelength mode (e.g., a two-wavelength mode) different than the first wavelength mode.

In such an embodiment, two or more of the plurality of operational modes—e.g., including at least the first operational mode and the second operational mode—is to provide a respective operation of the single-loop antenna using both the proximity-coupled feed structure and the first contact (e.g., with both proximity-coupled feed structure 146 and a contact where interface 144 couples to antenna 110). For example, three or more of the plurality of operational modes may each provide a different wavelength mode of the single-loop antenna using the proximity-coupled feed structure and the first contact.

The first operational mode may provide communication with the single-loop antenna at a first frequency—e.g., wherein the second operational mode is to provide communication with the single-loop antenna at a second frequency, and wherein a difference between the first frequency and the second frequency is at least 1000 megahertz (MHz). For example, the difference between the first frequency and the second frequency may be at least 1500 MHz (and in some embodiments, at least 2000 MHz). Alternatively or in addition, two or more of the plurality of operational modes may each provide communication with the single-loop antenna in a respective band defined, for example, by a Long-Term Evolution (LTE) standard. For example, the plurality of operational modes may include operational modes each to provide a different respective one of a one-wavelength mode of communication in a LTE low band, a two-wavelength mode of communication in a LTE mid-band and a three-wavelength mode of communication in a LTE high band.

In an embodiment, method 200 comprises configuring the first operational mode, at 230, based on the selecting at 220. The configuring at 230 may, for example, include setting a configuration of a receiver circuit coupled to the single-loop antenna and/or a transmitter circuit coupled to the single-loop antenna. Subsequently, at 240, method 200 perform a wireless communication with a first wavelength mode of the single-loop antenna.

In some embodiments, method 200 includes additional operations (not shown) to transition the body-mountable device from an operational mode corresponding to one high-frequency band to another operational mode corresponding to a different high-frequency band. For example, method 200 may further comprise receiving another signal (e.g., similar to that received at 210) indicating that communication with the single-loop antenna is to take place in a different frequency band above 100 MHz. Based on this other signal, method 200 may further select another operational mode (e.g., the second operational mode) from among the plurality of operational modes. This other selected operational mode may be subsequently configured and used for performing additional wireless communication with the single-loop antenna.

Figure 3:
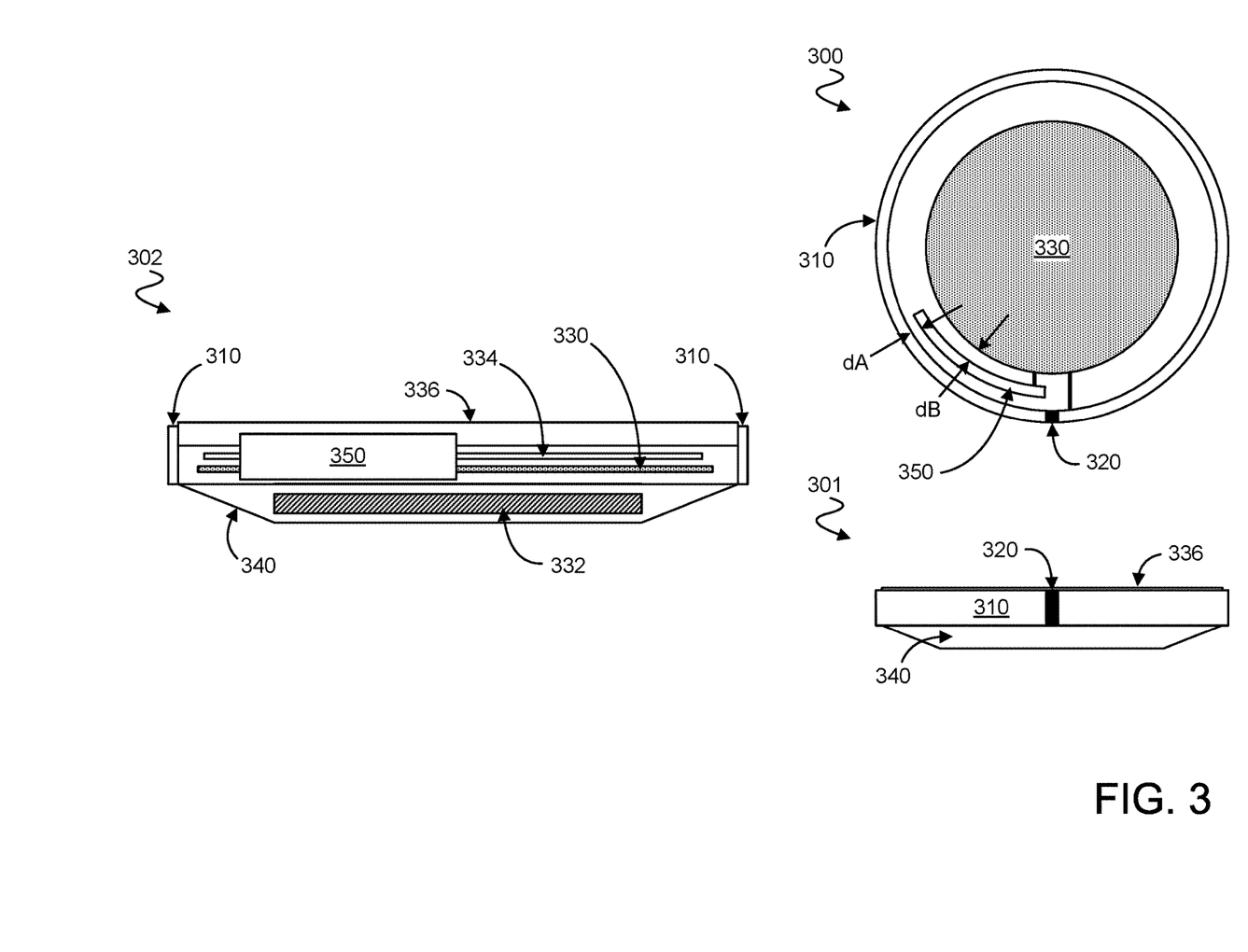
FIG. 3 shows a body-mountable device to perform communication with a single-loop antenna according to an embodiment.

FIG. 3 illustrates features of a body mountable communication device 300 to provide wireless LTE communication according to another embodiment. Communication device 300 may include features of one of communication devices 100, 150, for example. In the illustrative embodiment shown, communication device 300 includes a single-loop antenna 310, slit structure 320, printed circuit board (PCB) 330 and proximity-coupled feed structure 350 which, for example, provide corresponding functionality of single-loop antenna 110, slit structure 120, controller 140 and proximity-coupled feed structure 146, respectively.

As variously shown in the exterior side view 301 and cutaway side view 302 of communication device 300, an exterior side of antenna 310 may form at least in part an exterior sidewall structure of communication device 300. Distal ends of antenna 310 may be positioned on opposite respective sides of slit structure 370 for antenna 310 to conform to a generally annular rectangle shape. The region circumscribed by antenna 310 may have disposed therein circuitry (e.g., disposed in or on PCB 330) coupled to provide wireless communication using single-loop antenna 310. For example, PCB 330 may be electrically shorted both to one end of antenna 310 and to proximity-coupled feed structure 350, wherein an opposite end of antenna 310 is proximate to—but not directly in contact with—proximity-coupled feed structure 350.

In one illustrative embodiment, a distance between antenna 310 and proximity-coupled feed structure 350 is in a range of 0.5 mm to 1.5 mm—e.g., wherein a distance dB between proximity-coupled feed structure 350 and PCB 330 is in a range of 0.5 mm to 5.0 mm. A battery 332, disposed in a housing structure 340 of communication device 300, may be coupled to provide power for high frequency wireless communication by PCB 330 and antenna 310. Battery 332 may further provide power for operation of one or more I/O components such as the illustrative display panel 334 which is disposed under a display glass 336.

Figure 4:
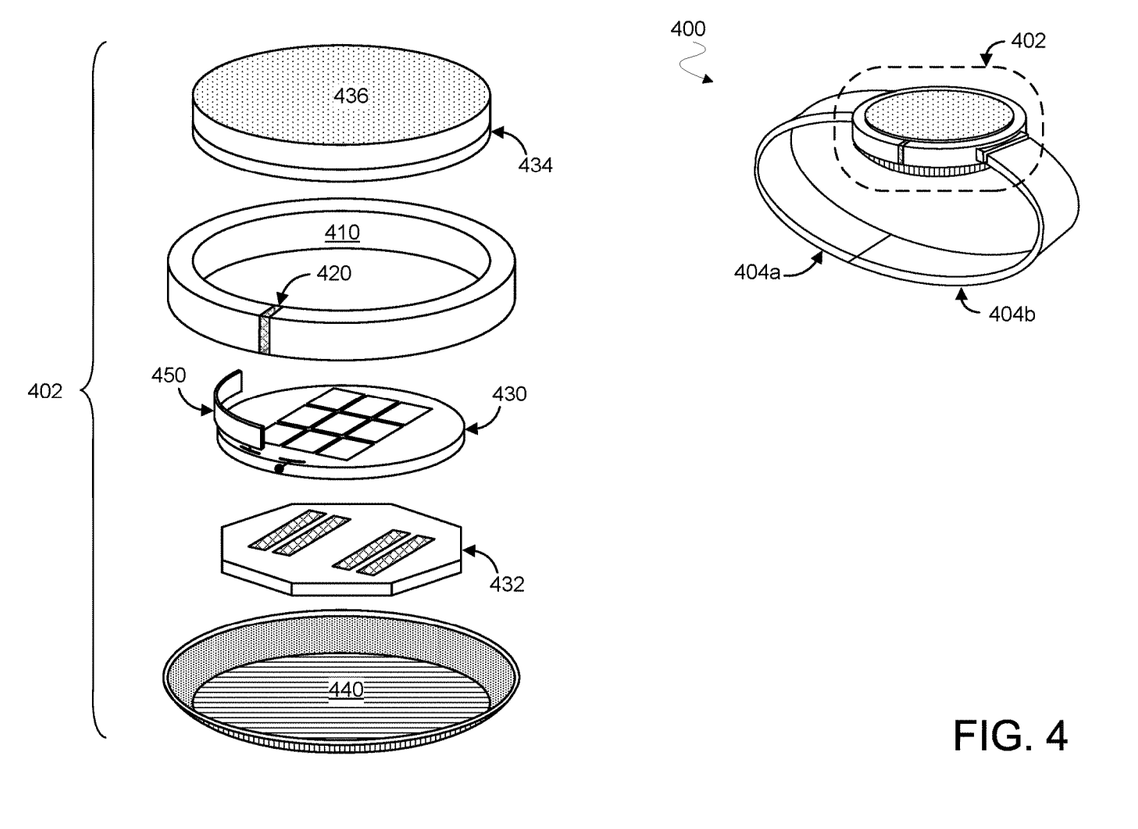
FIG. 4 shows a system to provide high-frequency wireless communication according to an embodiment.

FIG. 4 illustrates features of a system 400 including a body mountable communication device 402 to provide wireless LTE communication according to another embodiment. System 400 may function as a smartwatch, smart badge or other wearable communication device—e.g., wherein wristband 404a, 404b facilitate fastening of communication device 402 around a wrist of a user.

Communication device 402 may include features of one of communication devices 100, 150, 300, for example. Single-loop antenna 410 may form a sidewall structure of communication device 402, wherein distal ends of antenna 410 are disposed on opposite sides of a slit structure 420. Single-loop antenna 410 may extend around substantially all of a region in which is disposed a printed circuit board 430, battery 432, display panel 434, display glass 436, housing structure 440 and proximity-coupled feed structure 450—e.g., which provide the corresponding functionality of printed circuit board 330, battery 332, display panel 334, display glass 336, housing structure 340 and proximity-coupled feed structure 350, respectively.

Circuitry disposed in or on PCB 430 may be coupled to antenna 410 and proximity-coupled feed structure 450—e.g., where such circuitry is configured to participate in LTE (or other) communications using antenna 410 and proximity-coupled feed structure 450. Such communication may include any of a plurality of available communication modes that, for example, include various wavelength modes.

Figure 5:
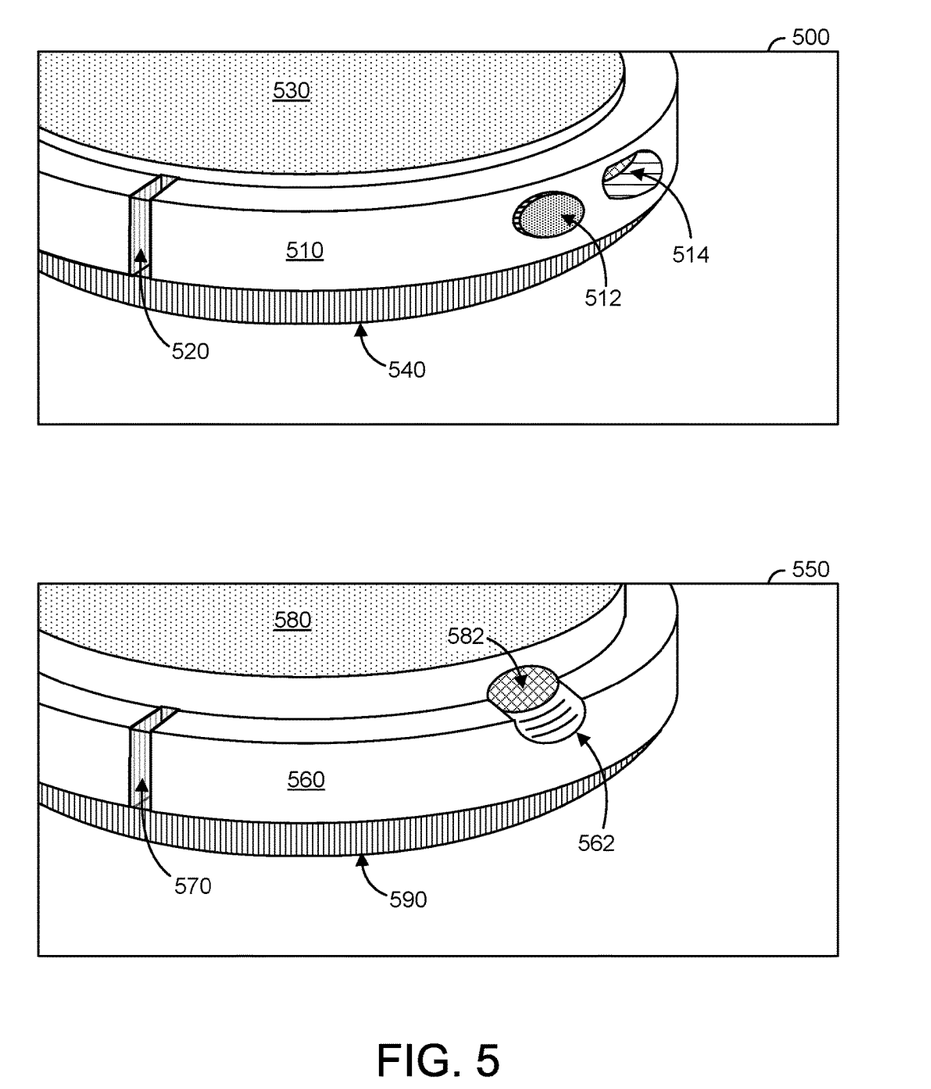
FIG. 5 shows a body-mountable device to perform communication with a single-loop antenna according to an embodiment.

FIG. 5 illustrates features of a body mountable communication device 500 to provide wireless LTE communication according to another embodiment. Communication device 500 may include features of one of communication devices 100, 150, 300, 402, for example. Communication device 500 may include a single-loop antenna 510 extending around a region 530 in which or under which is disposed a housing structure 540 (e.g., where a display glass forms a top of region 530). Antenna 510 may form an exterior sidewall structure of communication device 500. Distal ends of antenna 510 may variously form opposite sides of a slit structure 520. In an embodiment, antenna 510, housing structure 540 and slit structure 520 correspond functionally to antenna 410, housing structure 440 and slit structure 420, respectively.

Communication device 500 is one example of an embodiment wherein an antenna has formed therein a hole and/or a recess structure to facilitate space-efficient placement and operation of a sensor or input/output mechanism. By way of illustration and not limitation, a first hole extending through antenna 510 may be aligned to receive a button 512 operable by a user to navigate among elements of a graphical user interface (GUI) or otherwise operate circuit logic and/or executing software logic of communication device 500. Alternatively or in addition, a second hole 514 may extend through antenna 510, the second hole 514 aligned to enable a communication of sound from a speaker of communication device 500 and/or a receipt of sound at an acoustic sensor (e.g., a microphone) of communication device 500. However, the number, type and/or location of one or more I/O mechanisms that may be accommodated each a respective hole formed in antenna 510 may vary in different embodiments.

FIG. 5 further illustrates features of a body mountable communication device 550 to provide wireless LTE communication according to another embodiment. Communication device 550 may include features of one of communication devices 100, 150, 300, 402, for example. Communication device 550 may include a single-loop antenna 560 extending around a region 580 in which is disposed a housing structure 590. Antenna 560 may form an exterior sidewall structure of communication device 550. Distal ends of antenna 560 may variously form opposite sides of a slit structure 570. In an embodiment, antenna 560, housing structure 590 and slit structure 570 correspond functionally to antenna 510, housing structure 540 and slit structure 520, respectively.

Communication device 550 is another example of an embodiment wherein an antenna has formed therein one or more recess structures each to facilitate space-efficient placement and operation of a respective input/output mechanism. By way of illustration and not limitation, a recess structure extending into a top side of antenna 560 may be aligned with an I/O mechanism 582 of communication device 550—e.g., wherein I/O mechanism 582 includes a speaker, microphone, infrared sensor and/or the like. The number, type and/or location of one or more I/O mechanisms that may be accommodated each a respective recess structure formed in antenna 560 may vary in different embodiments.

In some embodiments, any hole or recess structure that extends through an antenna (e.g., through one of antennas 510, 560) is at least some minimum distance away from the slit structure formed between distal ends of the antenna. For example, any such hole or recess structure may be offset from the slit structure by at least ten percent (10%) of the overall distance along the interior side of the antenna. This offsetting of any such hole or recess structure may mitigates the possibility of a user shorting the distal ends of the antenna while touching a hole or recess structure formed in the antenna.

Figure 6:
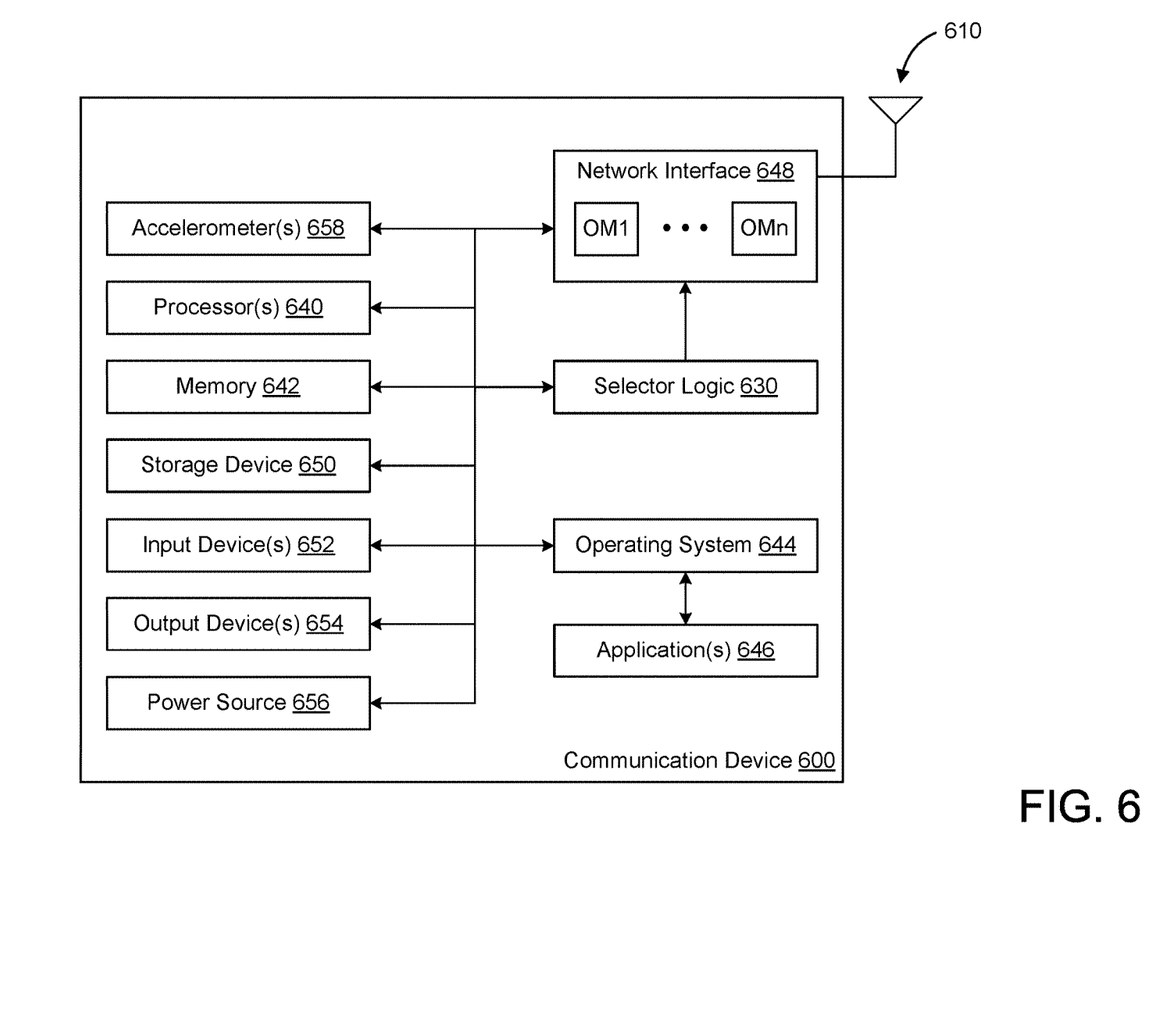
FIG. 6 is a high-level functional block diagram showing features of a communication device according to an embodiment.

FIG. 6 is a block diagram illustrating further details of one example of a communication device 600 according to an embodiment. Communication device 600 may include features of one of devices 100, 150, 300, 402, 500, for example. In an embodiment, communication device 600 includes one or more components to perform operations of method 200.

As shown in the example of FIG. 6, communication device 600 includes an antenna 610, one or more processors 640, memory 642, network interface 648, storage device 650, one or more input devices 652, one or more output devices 654, power source 656, one or more accelerometers 658 and selector logic 630. Communication device 600 may also include an operating system 644 and one or more applications 646—e.g., some or all of which execute with one or more processors 640. Each of components 610, 630, 640, 642, 644, 646, 648, 650, 652, 654, 656 and 658 may be interconnected (physically, communicatively, and/or operatively) for inter-component communications.

One or more processors 640 may be configured to implement functionality or process instructions for execution in communication device 600. Processors 640 may be capable of processing instructions stored in memory 642 or instructions stored on storage device 650.

Memory 642 may be configured to store information within communication device 600 during operation. Memory 642 may, in some examples, be described as a non-transitory or tangible computer-readable storage medium. In some examples, memory 642 is a temporary memory, meaning that a primary purpose of memory 642 is not long-term storage. Memory 642 may also, in some examples, be described as a volatile memory, meaning that memory 642 does not maintain stored contents when communication device 600 is turned off. Examples of volatile memories include random access memories (RAM), dynamic random access memories (DRAM), static random access memories (SRAM), and other forms of volatile memories known in the art. In some examples, memory 642 may be used to store program instructions for execution by one or more processors 640. Memory 642 may be used by software or applications running on communication device 600 (for example, one or more of applications 646) to temporarily store information during program execution.

Storage device 650 may also include one or more non-transitory or tangible computer-readable storage media. Storage device 650 may be configured for long-term storage of information. In some examples, storage device 650 may include non-volatile storage elements. Examples of such non-volatile storage elements may include optical discs, flash memories, or forms of electrically programmable memories (EPROM) or electrically erasable and programmable (EEPROM) memories.

Communication device 600 may also include one or more input devices 652. Input devices 652 may be configured to receive input, for example, from a user, through tactile, audio, or video input. Examples of input devices 652 may include a touch-sensitive display, a voice responsive system, a microphone, a camera, or any other type of device for detecting a command or input from a user. In some examples, one or more input devices 652 may also be an output device 654.

One or more output devices 654 may also be included in communication device 600, for example, a speaker. Output devices 654 may be configured to provide output to a user using tactile, audio, or video output. Output devices 654 may utilize a speaker, a graphics processor, or any other type of device for converting a signal into an appropriate form understandable to humans or machines. Additional examples of output devices 654 may include a liquid crystal display (LCD) or any other type of device that can provide output to a user. An output device 654 may also be a touch-sensitive or presence-sensitive screen. In one example, one or more output devices 654 may also be an input device 652.

Communication device 600 may include power source 656, which may be rechargeable and provide power to communication device 600. The power source 656 may be one or more batteries. The one or more batteries may be made from nickel-cadmium, lithium-ion, or any other suitable material. In another example, the power source 656 may include a power supply connection that receives power from a power source external to communication device 600.

Communication device 600 may utilize network interface 648 to communicate via antenna 610 with external devices via one or more networks (for example, a cellular or other network which supports LTE communication). Selector logic 630—e.g., comprising one or more of circuit hardware, firmware and executable software—may operate to select a particular one of multiple possible operational modes (such as the illustrative modes OM1, . . . , OMn shown), two or more of which are to provide a different respective wavelength mode of communication using antenna 610. Selector logic 630 and network 648 may, for example, provide functionality of one of controllers 140, 190—e.g., wherein antenna 610 is a functional representation of one of antennas 110, 160. In such an embodiment, selector logic 630 may perform operations of method 200 to implement one of modes OM1, . . . , OMn.

In one example, network interface 648 may correspond to wireless interface for receiving data from a remote device. In some examples, communication device 600 may include a plurality of either or both input and output interfaces. In some examples, network interface 648 may include separate input and output network interfaces. In other examples, input and output interfaces may be may be functionally integrated.

Network interface 648 may include a transceiver circuitry and, in some embodiments, circuitry to implement Ethernet, transmission control protocol (TCP), Internet protocol (IP), asynchronous transfer mode (ATM), or other network communication protocols. In other examples, network interface 648 may be a transceiver operable to send and receive information in any of multiple high-frequency bands (e.g., two or more of which correspond to different respective wavelength modes of antenna 610). Examples of such network interfaces may include 4G, LTE Advanced, Bluetooth®, 3G and WiFi® radios in mobile computing devices as well as USB. In some examples, communication device 600 may utilize network interface 648 to wirelessly communicate with an external device, such as another body-mountable device, a server, or other networked computing device.

Communication device 600 may include operating system 644. Operating system 644 may control the operation of components of communication device 600. For example, operating system 644 may facilitate the interaction of application 646 with processors 640, memory 642, network interface 648, storage device 650, input devices 652, output devices 654 and power source 656.

Any applications, for example applications 646, implemented within or executed by communication device 600 may be implemented or contained within, operable by, executed by, or be operatively or communicatively coupled to components of communication device 600, for example, one or more processors 640, memory 642, network interface 648 or storage device 650.

Techniques described herein may be implemented, at least in part, in hardware, software, firmware, or any combination thereof. For example, various aspects of the described embodiments may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described herein. In addition, any of the described units, modules or components may be implemented together or separately as discrete but interoperable logic devices. Depiction of different features as modules or units is intended to highlight different functional aspects and does not necessarily imply that such modules or units are realized by separate hardware, firmware, or software components. Rather, functionality associated with one or more modules or units may be performed by separate hardware, firmware, or software components, or integrated within common or separate hardware, firmware, or software components.

Techniques described herein may also be embodied or encoded in an article of manufacture including a computer-readable storage medium encoded with instructions. Instructions embedded or encoded in an article of manufacture including an encoded computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

In some examples, computer-readable storage media may comprise non-transitory media. The term "non-transitory" may indicate that the storage medium is not embodied in a carrier wave or a propagated signal. In certain examples, a non-transitory storage medium may store data that can, over time, change (for example, in RAM or cache).

Various aspects of the disclosure have been described. Aspects or features of examples described herein may be combined with any other aspect or feature described in another example. These and other embodiments are within the scope of the following claims.

What is claimed is:

1. A body-mountable device comprising:
   a single-loop antenna extending around a region, the single-loop antenna forming at least in part an exterior sidewall of the body-mountable device, wherein distal ends of the single-loop antenna are disposed on opposite respective sides of a slit structure in the exterior sidewall, wherein an overall length along the single-loop antenna between the distal ends is equal to or less than 250 millimeters (mm);
   a proximity-coupled feed structure disposed in the region, the proximity-coupled feed structure to excite the single-loop antenna with electromagnetic radiation; and
   a controller disposed in the region, the controller coupled to the single-loop antenna via a first contact and further coupled to the proximity-coupled feed structure, the controller including selector logic which, when executed by the controller, selects from among a plurality of operational modes including:
      a first operational mode corresponding to a first frequency band above 100 megahertz (MHz), the first operational mode to provide, with both the proximity-coupled feed structure and the first contact, a first wavelength mode of communication by the single-loop antenna; and
      a second operational mode corresponding to a second frequency band above 100 MHz, the second operational mode to provide, with both the proximity-coupled feed structure and the first contact, a second wavelength mode of communication by the single-loop antenna, the second wavelength mode different than the first wavelength mode.

2. The body-mountable device of claim 1, wherein the first operational mode is to provide communication with the single-loop antenna at a first frequency and wherein the second operational mode is to provide communication with the single-loop antenna at a second frequency, wherein a difference between the first frequency and the second frequency is at least 1000 megahertz (MHz).

3. The body-mountable device of claim 2, wherein the difference between the first frequency and the second frequency is at least 1500 MHz.

4. The body-mountable device of claim 1, the plurality of operational modes each to provide communication with the single-loop antenna in a respective band defined by a Long-Term Evolution (LTE) standard.

5. The body-mountable device of claim 1, wherein the plurality of operational modes includes operational modes each to provide a different respective one:
    a one-wavelength mode of communication in a LTE low band including a frequency range of 800 MHz to 960 MHz;
    a two-wavelength mode of communication in a LTE mid-band including a frequency range of 1710 MHz to 2200 MHz; and
    a three-wavelength mode of communication in a LTE high band including a frequency range of 2300 MHz to 2700 MHz.

6. The body-mountable device of claim 1, the single-loop antenna having a hole formed therein.

7. The body-mountable device of claim 6, wherein any hole formed in the single-loop antenna is offset away from the slit structure by a distance equal to at least ten percent (10%) of the overall length.

8. The body-mountable device of claim 1, wherein a side of the single-loop antenna has a recess structure formed therein, the recess structure aligned with a sensor of the body-mountable device.

9. The body-mountable device of claim 8, wherein any recess structure formed by the single-loop antenna is offset away from the slit structure by a distance equal to at least ten percent (10%) of the overall length.

10. The body-mountable device of claim 1, wherein a width of the slit structure is equal to or less than 4 mm.

11. The body-mountable device of claim 1, wherein the slit structure comprises at least one dielectric material disposed between the distal ends.

12. A method at a body-mountable device, the method comprising:
    receiving a signal indicating that a communication with a single-loop antenna is to take place in a first frequency band above 100 megahertz (MHz), wherein the single-loop antenna forms at least in part an exterior sidewall of the body-mountable device, wherein distal ends of the single-loop antenna are disposed on opposite respective sides of a slit structure in the exterior sidewall, wherein an overall length along the single-loop antenna between the distal ends is equal to or less than 250 millimeters (mm);
    selecting, based on the signal, a first operational mode from among a plurality of operational modes which are each to provide, with both a proximity-coupled feed structure and a first contact at the single-loop antenna, a respective wavelength mode of communication by the single-loop antenna;
    based on the selecting, configuring the first operational mode; and
    with the single-loop antenna, performing a wireless communication with a first wavelength mode of the single-loop antenna, the wireless communication including exciting the single-loop antenna with electromagnetic radiation using the proximity-coupled feed structure.

13. The method of claim 12, wherein the first operational mode is to provide communication with the single-loop antenna at a first frequency and wherein a second operational mode of the plurality of operational modes is to provide communication by the single-loop antenna at a second frequency, wherein a difference between the first frequency and the second frequency is at least 1000 megahertz (MHz).

14. The method of claim 13, wherein the difference between the first frequency and the second frequency is at least 1500 MHz.

15. The method of claim 12, the plurality of operational modes each to provide communication with the single-loop antenna in a respective band defined by a Long-Term Evolution (LTE) standard.

16. The method of claim 12, wherein the plurality of operational modes includes operational modes each to provide a different respective one:
    a one-wavelength mode of communication in a LTE low band including a frequency range of 800 MHz to 960 MHz;
    a two-wavelength mode of communication in a LTE mid-band including a frequency range of 1710 MHz to 2200 MHz; and
    a three-wavelength mode of communication in a LTE high band including a frequency range of 2300 MHz to 2700 MHz.

17. The method of claim 12, the single-loop antenna having a hole formed therein.

18. The method of claim 12, wherein a side of the single-loop antenna has a recess structure formed therein, the recess structure aligned with a sensor of the body-mountable device.

19. A non-transitory computer-readable storage medium having stored thereon instructions which, when executed by one or more processing units, cause the one or more processing units to perform a method comprising:
    receiving a signal indicating that a communication with a single-loop antenna is to take place in a first frequency band above 100 megahertz (MHz), wherein the single-loop antenna forms at least in part an exterior sidewall of a body-mountable device, wherein distal ends of the single-loop antenna are disposed on opposite respective sides of a slit structure in the exterior sidewall, wherein an overall length along the single-loop antenna between the distal ends is equal to or less than 250 millimeters (mm);
    selecting, based on the signal, a first operational mode from among a plurality of operational modes which are each to provide, with both a proximity-coupled feed structure and a first contact at the single-loop antenna, a respective wavelength mode of communication by the single-loop antenna;
    based on the selecting, configuring the first operational mode; and
    with the single-loop antenna, performing a wireless communication with a first wavelength mode of the single-loop antenna, wherein the wireless communication includes exciting the single-loop antenna with electromagnetic radiation using the proximity-coupled feed structure.

20. The computer-readable storage medium of claim 19, wherein the first operational mode is to provide communication with the single-loop antenna at a first frequency and wherein a second operational mode of the plurality of operational modes is to provide communication by the single-loop antenna at a second frequency, wherein a difference between the first frequency and the second frequency is at least 1000 megahertz (MHz).

21. The computer-readable storage medium of claim 19, the plurality of operational modes each to provide communication with the single-loop antenna in a respective band defined by a Long-Term Evolution (LTE) standard.

22. The computer-readable storage medium of claim 19, wherein the plurality of operational modes includes operational modes each to provide a different respective one:
- a one-wavelength mode of communication in a LTE low band including a frequency range of 800 MHz to 960 MHz;
- a two-wavelength mode of communication in a LTE mid-band including a frequency range of 1710 MHz to 2200 MHz; and
- a three-wavelength mode of communication in a LTE high band including a frequency range of 2300 MHz to 2700 MHz.

* * * * *